(12) United States Patent
Hartman

(10) Patent No.: US 10,415,732 B2
(45) Date of Patent: Sep. 17, 2019

(54) SAFETY LOCK FOR CAM LOCK FITTING

(71) Applicant: Jeffrey Hartman, Mobile, AL (US)

(72) Inventor: Jeffrey Hartman, Mobile, AL (US)

(73) Assignee: George L Williamson, Fairhope, AL (US)

( * ) Notice: Subject to any disclaimer, the term of this patent is extended or adjusted under 35 U.S.C. 154(b) by 816 days.

(21) Appl. No.: 14/937,582

(22) Filed: Nov. 10, 2015

(65) Prior Publication Data

US 2017/0130884 A1   May 11, 2017

(51) Int. Cl.
 *F16L 35/00* (2006.01)
 *F16L 37/18* (2006.01)

(52) U.S. Cl.
 CPC ............. *F16L 35/00* (2013.01); *F16L 37/18* (2013.01); *F16L 2201/20* (2013.01)

(58) Field of Classification Search
 CPC ... F16L 35/00; F16L 2201/20; F16L 2201/10; F16L 37/18; F16L 37/20; F16L 37/127
 USPC ............................ 285/1, 82, 83, 87, 88, 312
 See application file for complete search history.

(56) References Cited

U.S. PATENT DOCUMENTS

| | | | |
|---|---|---|---|
| 2,478,586 A * | 8/1949 | Krapp | F16L 37/18 285/312 |
| 3,383,123 A | 5/1968 | Murray | |
| 3,409,316 A * | 11/1968 | Jewell | F16L 37/20 285/311 |
| 3,860,274 A | 1/1975 | Ledstrom et al. | |
| 4,222,593 A | 9/1980 | Lauffenburger | |
| 4,269,215 A | 5/1981 | Odar | |
| 4,538,632 A | 9/1985 | Vogl | |
| 4,575,130 A * | 3/1986 | Pemberton | F16L 37/18 141/349 |
| 4,802,694 A * | 2/1989 | Vargo | F16L 37/18 285/312 |
| 5,005,876 A * | 4/1991 | Fahl | F16L 37/20 285/311 |
| 5,234,017 A | 8/1993 | Aflin et al. | |
| 5,338,069 A | 8/1994 | McCarthy | |
| 5,595,217 A | 1/1997 | Gillen et al. | |
| 5,863,079 A | 1/1999 | Donais et al. | |
| 6,095,190 A | 8/2000 | Wilcox et al. | |
| 7,147,004 B1 | 12/2006 | Hartman | |
| 8,123,256 B1 | 2/2012 | Hartman | |
| 8,632,103 B2 | 1/2014 | Fahie et al. | |
| 2012/0090701 A1* | 4/2012 | Chang | F16L 37/18 137/384.8 |

(Continued)

*Primary Examiner* — David Bochna
*Assistant Examiner* — James A Linford
(74) *Attorney, Agent, or Firm* — George L Williamson

(57) ABSTRACT

Method and apparatus for a safety lock assembly for a cam lock fitting mounted onto the outside of the cam lock fitting so that the safety lock mechanism is in close proximity to the cam levers so that when the cam lock fitting is pressurized and the operator attempts to open the cam lock fitting the safety lock mechanism will prevent operation or separation of the male and the female portions of the fitting. This is accomplished by having slidable axles mounted in elongated slots in the bosses adapted to slide in response to movement of a safety lock mechanism handle so that the male and female portions of the cam lock fitting initially only slightly separate allowing the operator to quickly reclose the cam lock fitting if the operator observes that the cam lock fitting is still pressurized.

18 Claims, 3 Drawing Sheets

(56) References Cited

U.S. PATENT DOCUMENTS

2015/0252931 A1* 9/2015 Solimar ............... F16L 37/18
                                                    285/312

* cited by examiner

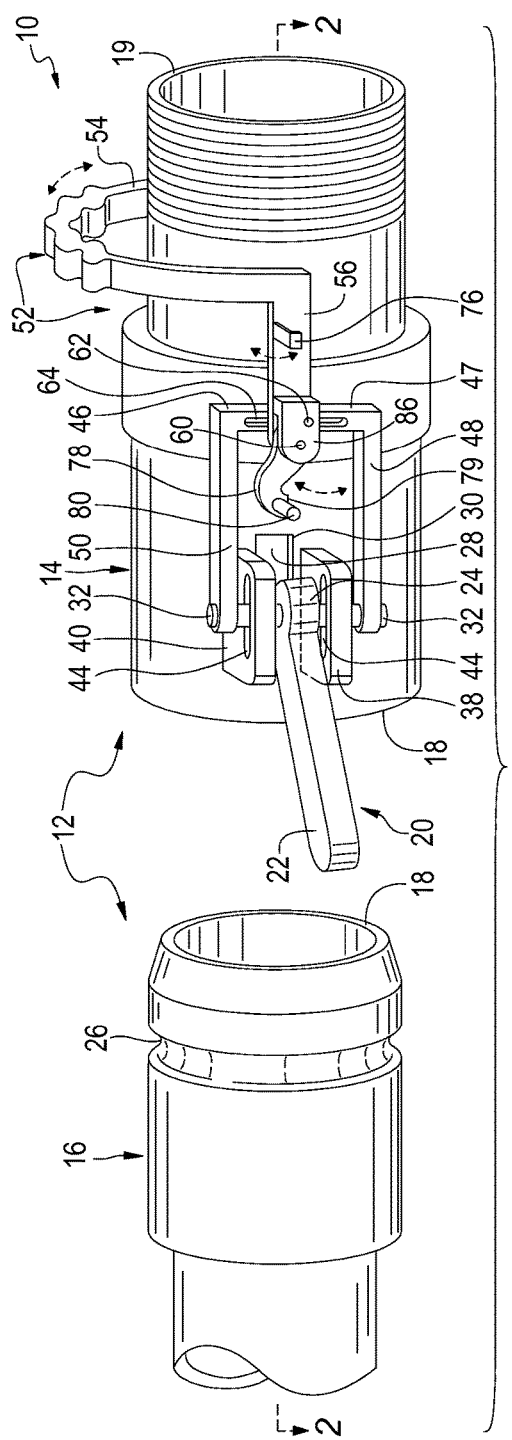
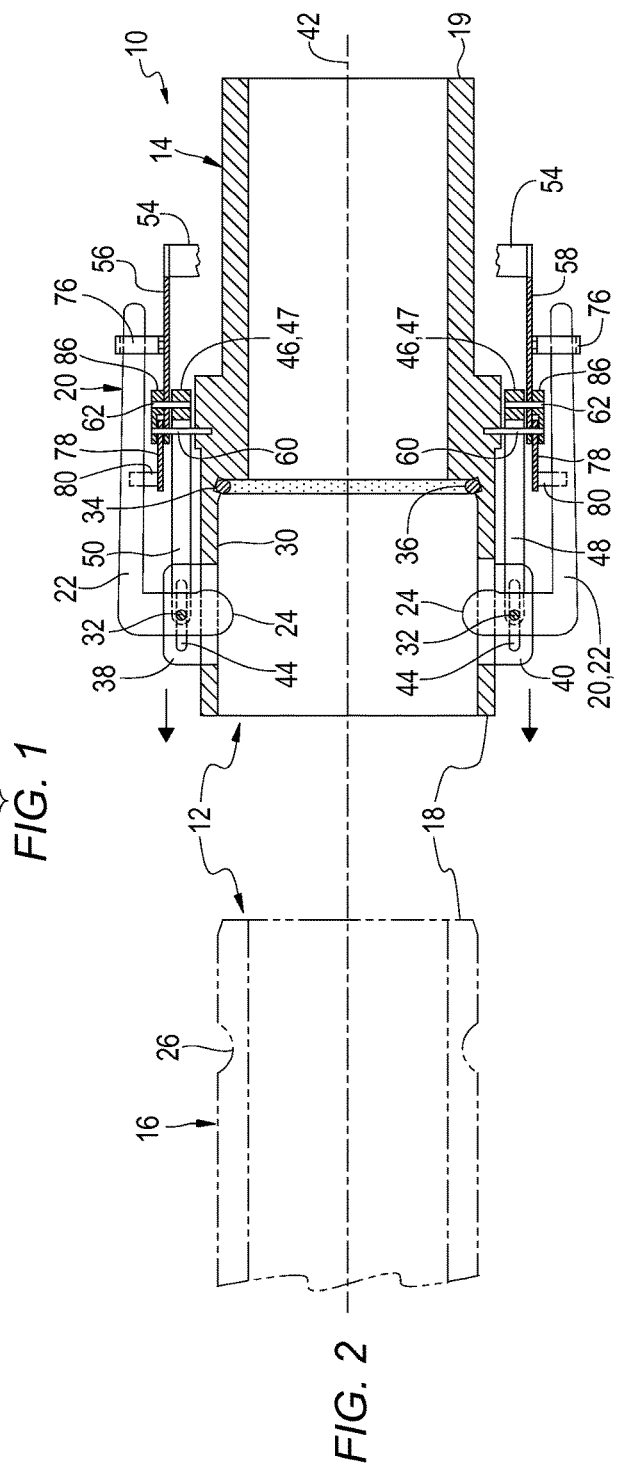

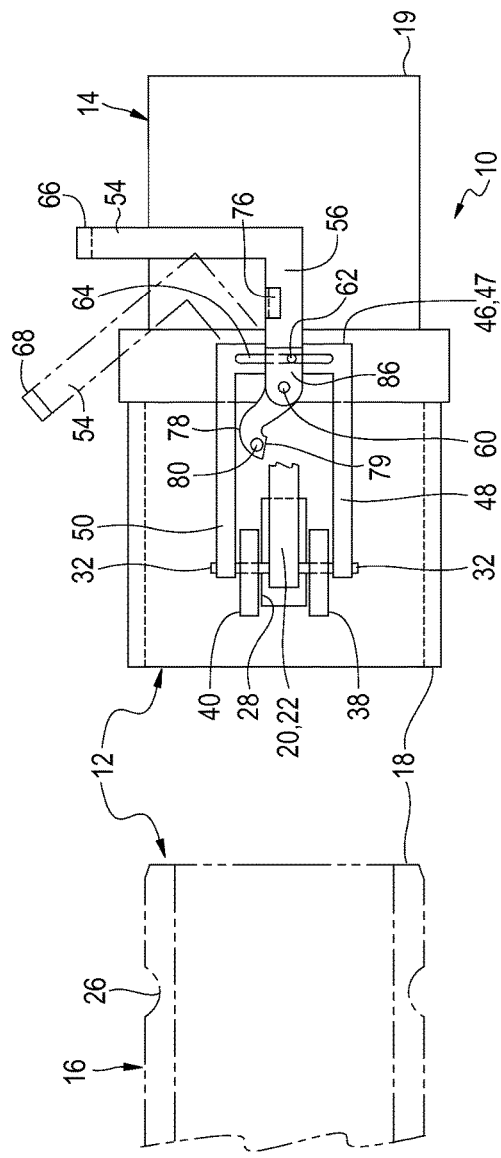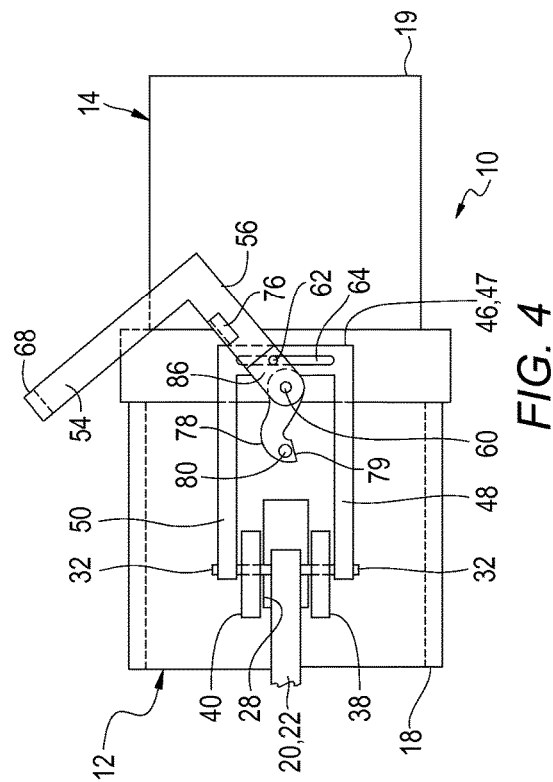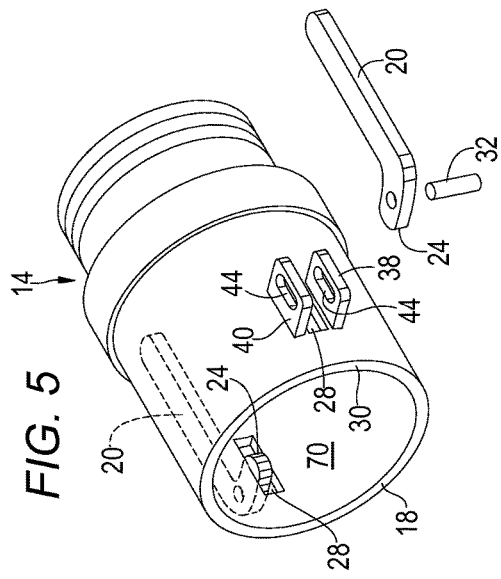

SAFETY LOCK FOR CAM LOCK FITTING

BACKGROUND OF THE INVENTION

Field of the Invention

The present invention relates generally to cam lock fittings and, more particularly, is concerned with a safety lock for a cam lock fitting.

Description of the Related Art

Cam lock fittings having safety features have been described in the related art. However, none of the related art devices disclose the unique features of the present invention. U.S. Pat. No. 6,095,190 to Wilcox, et al., dated Aug. 1, 2000, disclosed a coupling with a female half having internal pressure relief. U.S. Pat. No. 5,863,079 to Donais, et al., dated Jan. 26, 1999, disclosed a quick-connect, disconnect coupling. U.S. Pat. No. 5,595,217 to Gillen, et al., dated Jan. 21, 1997, disclosed a dry break coupling assembly with a cam locking connection system. U.S. Pat. No. 5,234,017 to Aflin, et al., dated Aug. 10, 1993, disclosed a restrictor valve for metered liquid dispensing system. U.S. Pat. No. 4,538,632 to Vogl dated Sep. 3, 1985, disclosed a shut-off valve for a fuel truck or tanker drain of having down spouts. U.S. Pat. No. 4,269,215 to Odar dated May 26, 1981, disclosed a vapor flow control valve. U.S. Pat. No. 3,1860,274 to Ledstrom, et al., dated Jan. 14, 1975 disclosed a pipe coupling. U.S. Pat. No. 4,222,593 to Lauffenburger disclosed a fluid conveying coupling with safety locking device. U.S. Pat. No. 8,123,256 to Hartman dated Feb. 28, 2012 disclosed a safety lock for a cam lock fitting. U.S. Pat. No. 7,147,004 to Hartman dated Dec. 12, 2006 disclosed a check valve for a cam lock fitting. U.S. Pat. No. 3,383,123 to Murray dated May 14, 1968 disclosed a line pressure responsive safety coupling. U.S. Pat. No. 5,338,069 dated Aug. 16, 1994 to McCarthy disclosed a positively locking quick release coupling. U.S. Pat. No. 8,632,103 dated Jan. 21, 2014 to Fahie, et al. disclosed a lock for cam and groove coupler. While these devices related to cam lock fittings may be suitable for the purposes for which they were designed, they would not be as suitable for the purposes of the present invention, as hereinafter described. As will be shown by way of explanation and drawings, the present invention works in a novel manner and differently from the related art.

SUMMARY OF THE PRESENT INVENTION

The present invention discloses a safety lock mechanism for a cam lock fitting mounted onto the outside of the cam lock fitting in close proximity to the cam lever so that when the cam lock fitting is pressurized unbeknown to the operator and the operator attempts to open the cam lock fitting the safety lock mechanism will prevent operation or complete separation of the male and the female portions of the fitting to prevent inadvertent pressurized discharge of dangerous materials. This is accomplished by having slidable axles mounted in elongated slots in the bosses upon which the cam levers are mounted which axles are adapted to slide in response to movement of a safety handle so that the male and female portions of the cam lock fitting initially only slightly separate from each other allowing the operator to quickly reclose the cam lock fining if the operator observes that the cam lock fitting still contains pressurized material.

A major problem sought to be solved by the present invention is that when an operator of a conventional cam lock fitting undertakes the operation of opening a conventional cam lock fitting the operator may not know if the contents of the conventional fitting are still under pressure, and if the contents are still under pressure the contents will spew out when the conventional fitting is opened possibly resulting in injury to the operator or an unwanted release of materials to the environment. The present invention resolves this problem by allowing the improved cam lock fitting to be only partially opened by means of a safety lock assembly which allows the improved fitting to be reclosed if the operator observes that the contents inside the improved fitting remain pressurized.

An object of the present invention is to provide a safety lock on a cam lock fitting so as to prevent overflows of fluid when the cam lock fitting is opened. A further object of the present invention is to provide a safety lock on the female end of a cam lock fitting. A further object of the present invention is to provide a safety lock which can be easily operated by a user as a part of the normal operation of a cam lock fitting. A further object of the present invention is to provide a safety lock which will remain locked when the cam lock fitting is pressurized. A further object of the present invention is to provide a safety lock on a cam lock fitting which will prevent inadvertent pressurized discharges of environmentally damaging material from a hose connected to the cam lock fitting. A further object of the present invention is to provide a safety lock on a cam lock fitting which can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is perspective view of the present invention.

FIG. 2 is a sectional view taken generally along line 2-2 of FIG. 1 with certain parts shown in elevation for ease of illustration.

FIGS. 3 and 4 are side elevation views of portions of the present invention.

FIG. 5 is a perspective view showing the inside of a female coupling of the present invention.

LIST OF REFERENCE NUMERALS

Figure 8:
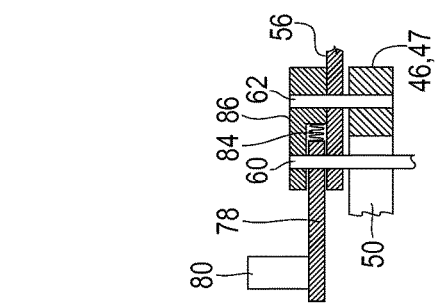
FIG. 8 is an enlarged view of portions of the present invention.

With regard to reference numerals used, the following numbering is used throughout the drawings.

10 present invention
12 cam lock fitting
14 female end portion
16 male end portion
18 front end
19 rear end
20 cam lever/ear
22 lever portion
24 cam portion
26 groove
28 opening
30 wall of cam lock fitting
32 axle
34 recess for O-ring
36 O-ring
38 boss
40 boss
42 center line
44 slot
46 bracket
47 base portion of bracket
48 arm portion of bracket
50 arm portion of bracket
52 safety lock assembly
54 safety handle portion
56 arm portion
58 arm portion
60 pivot
62 pin/roller
64 slot
66 first position of safety lock assembly
68 second position of safety lock assembly
70 inside of female end portion
74 space
76 latch member
78 hook-like finger member
79 tip of hook-like finger member
80 protrusion
82 material/fluid
84 spring
86 housing
88 arm
90 pivot
92 lug

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims. FIGS. 1-9 illustrate the present invention wherein a safety lock for a cam lock fitting is disclosed and which is generally indicated by reference number 10.

Turning to FIGS. 1 and 2, therein is shown the present invention 10 showing a cam lock fitting 12 having a female end coupling portion 14 and a male end coupling portion 16 each having an end 18 which when joined together form a conduit through which fluid or the like will flow. The female portion 14 has a pair of cam levers or ears 20, each having a lever portion 22 and a cam portion 24 thereon, which cam portion locks the female end 14 to the male end 16 by seating the cam portion 24 of the female portion within a groove 26 of the male portion so that the two portions are joined together. The cam portion 24 projects through an opening 28 in the wall 30 near the end 18 of the female portion 14 as the ears 20 pivot on axles 32. Also shown on the female portion 14 is a recess 34 having an O-ring seal 36 therein wherein the recess and O-ring extend entirely around the internal periphery of the female portion for making sealing contact with the end 18 of the male end portion 16 in a conventional manner. The ears 20 are each mounted onto an axle 32 extending through a first, left and second, right boss 38, 40 on opposite sides of female coupling 14 and as taught by the present invention 10 the axle 32 is mounted in the bosses 38, 40 so as to be slidably movable toward the front 18 or rear end 19 of the female coupling 14 in a line parallel to the centerline 42 of the female coupling due to each boss having an elongated slot 44 therein wherein the slot is effectively elongated parallel to centerline 42 to allow sufficient movement of axle 32 parallel to centerline 42. A U-shaped bracket 46 having a base portion 47 and a pair of oppositely disposed arm portions 48, 50 wherein each arm portion is connected to an end of the axle 32 passing through bosses 38, 40 so that axle 32 moves in response to movement of bracket 46. Also shown is a safety lock assembly or mechanism 52 having a U-shaped safety lock handle portion 54 and a safety lock arm portion 56, 58 disposed on opposite sides of the female coupling 14 wherein each arm portion is mounted on a pivot 60 near its distal end being mounted onto an external surface of the wall 30 of the female portion 14 so that the handle portion 54 can be moved or partially rotated from a first position to a second position as shown in FIG. 3. Handle 54 is ergonomically shaped/designed with indentations to fit a hand/knuckles of an operator. Each arm portion 56, 58 has a pin/roller 62 thereon which cooperates with a slot 64 in the base 47 of bracket 46 so that when the handle portion 54 is in a first downward closed position the bracket 46 is moved to a first rear position away from end 18 and when the handle portion 54 is in an second upward open position the bracket 46 moves to a second forward position toward end 18. Because handle 54 and bracket 46 move in perpendicular planes, motion from moving handle 54 is transferred to bracket 46 by providing pin/roller 62 to move in slot 64 so that handle 54 cooperates with bracket 46 and axle 32. Pin 62 is also disposed on a lower portion of arm 56 to provide increased leverage on bracket 46.

In order for an operator to open a cam lock fitting 12 designed according to the teachings of the present invention 10, the operator must first move the safety handle 54 from the first downward closed position to the second upward open position so that the axles 32 are moved from a rearward position away from end 18 to a forward position toward end 18 so as to partially open the cam lock fitting 12 so as to partially relieve internal pressure contained inside the camlock fitting. If there is no pressure remaining in the camlock fitting 12 the operator can continue with the next step of opening the fitting in the conventional manner by releasing the ears 20 and separating the male and female conduit portions 14-16. If there is still pressure inside the camlock fitting 12 when the safety lock handle 54 is opened, the operator will immediately reclose the safety lock handle so as to pull the axles 32 back into the locked position so as to reclose and reseal the camlock fitting. Also shown is an additional latch member 76 mounted on arm portions 56, 58 which latches have an end thereon which end engages or cooperates with lever 22 to prevent the levers from being opened without first moving safety handle 54 from its closed position to its open position. After the safety handle 54 is moved to its open position and latch 76 moved away from lever 22, then the levers 22 can be opened in the conventional manner. The purpose of latch 76 is to prevent an operator from inadvertently opening levers 22 without first opening handle 54.

Also shown is hook-like member 78 having an outwardly extending enlargement or protrusion 80 disposed thereon near the tip 79 or end of the hook-like finger member. The hook-like finger member 78 is pivotally disposed on and somewhat axially extending from arm 56 and biased counterclockwise or downwardly (as illustrated in FIG. 1) due to spring 84 so as to pivot at 60 in the upwardly or downward direction relative to arm 58 as illustrated by a direction arrow in FIG. 1. Hook-like finger 78 is pivotally mounted internal housing 86 onto an outer distal end of arms 56, 58 and as shown in FIG. 1 is mounted in an off-set relationship to the arms 56, 58, however, it is believed that finger 78 may be otherwise mounted onto the present invention 10. A hook-like finger member 78 is mounted on both arms 56, 58. The purpose of hook-like finger member 78 is to prevent an operator from inadvertently closing lever 22 without first closing handle 54. This is accomplished by having finger 78 and the outwardly or laterally extending protrusion 80 snap downwardly (due to counterclockwise biased action of spring 84) into the path of lever 22, after lever 22 is opened/raised, so as to prevent the closure of lever 22 without first closing handle 54 as best seen and explained in FIGS. 3 and 4. When handle 54 is closed, then finger 78 moves out of the way and lever 22 can then be closed as best seen and explained in FIGS. 3 and 4.

Turning to FIG. 3-4, therein is shown the present invention 10 showing the handle portion 54 of the safety lock assembly 52 in a first downward closed position shown at 66 and then in a second upward open position shown at 68 in order to illustrate the movement of the handle portion of the safety lock assembly. The axle 32 is adapted to move in its slot (slot not visible, see item 44 in FIG. 6) in response to movement of the handle portion 54 by having bracket 46, previously explained relative to FIGS. 1 and 2, connected to the axles 32 which axle passes through the bosses 38, 40 and the cam lever 20 so that the axle can slide either toward or away from end 18 in response to movement of the handle portion 54. As illustrated in FIG. 3, when handle 54 is in downward position 66 with arm 56 shown parallel to centerline 42, hook-like finger member 78 and its protrusion 80 are disposed so as to be non-aligned with the path of lever 22 so as to allow lever 22 to close downwardly. In this position, tip 79 of finger 78 may either be touching or very close to the upper side of lever 22, and, when handle 54 is raised to position 68, tip 79 is biased so as to make contact with or against the upper side of lever 22. Then, as illustrated in FIG. 4, when lever 22 is raised/opened, finger 78 snaps downwardly so that protrusion 80 is in its path so that when handle 54 is in upward position 68, hook-like member 78 and its protrusion 80 are disposed so as to align with the path of lever 22 so as to prevent lever 22 from closing downwardly without first moving handle 54 back to the closed position at 66. Previously disclosed elements are also shown.

Turning to FIG. 5, therein is shown the inside 70 of the female coupling 14 along with the cam levers 20 on opposing sides of the female end portion 14 showing the bosses 38, 40 on the female coupling and having a first slot 28 through which the cam portion 24 of the levers pass through the wall 30 of the female end portion 14 along with the elongated slots 44 in the bosses 38-40 so that the axle 32 is slidable in the slots 44. As previously disclosed, the axles 32 are connected to a bracket 46 (not shown, see FIG. 1) so that the bosses slide in slot 44 in response to movement of the handle 54 (not shown, see FIG. 1). Note that the openings 28 are elongated to accommodate movement of the cams 24 for an expected distance of about ⅛ inch to about ⅜ inch. The bosses 38, 40 are attached onto the outside of the female coupling 14 in the conventional manner. Previously disclosed elements may also be shown.

Figure 6:
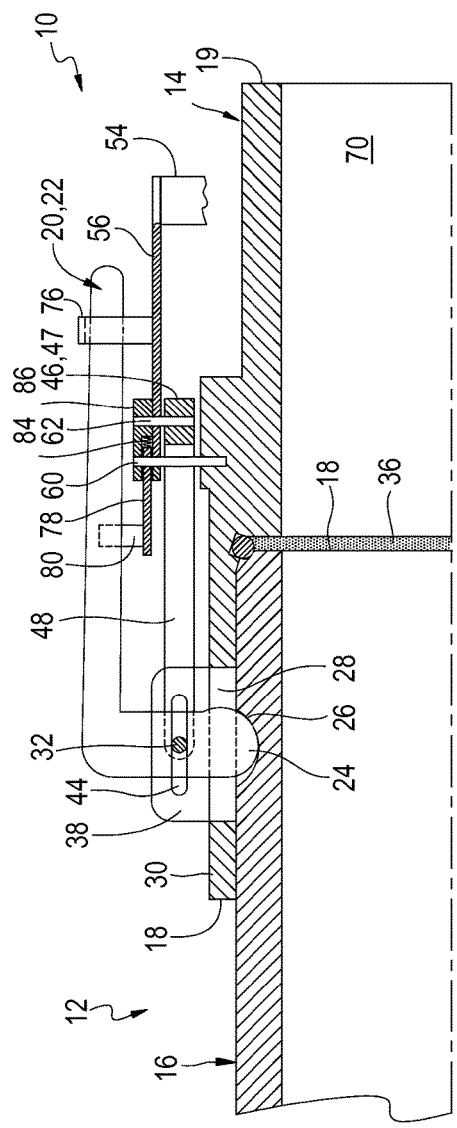
FIGS. 6 and 7 are sectional views taken generally along line 2-2 of FIG. 1 with certain parts shown in elevation for ease of illustration.
Figure 7:
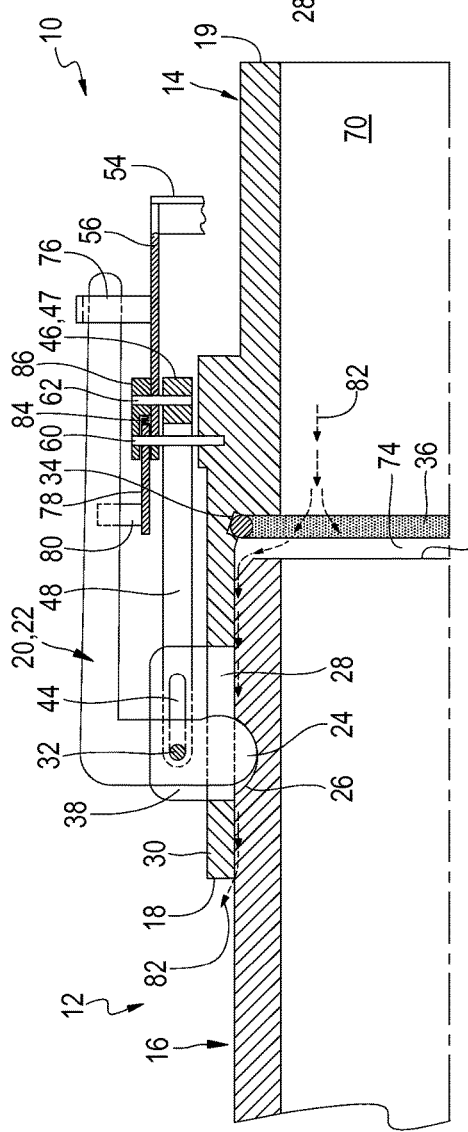

Turning to FIGS. 6-7, therein is shown the movement of the male end portion 16 relative to the female portion 14 in response to movement of the safety handle 54 as previously disclosed. FIG. 6 shows the male end portion 16 mated tightly to the female portion 14 as would be the condition when the cam lock fitting 12 is in a sealed position and the safety handle 54 is in a first downward closed position so that the end 18 of the male end portion 16 is tightly sealed against the O-ring 36 of the female end portion 14. It can be seen in FIG. 6 that the axles are positioned in the slot 44 so as to be disposed away from end 18 and toward the rear end 19 of the female end portion 14 of the cam lock fitting 12. In contrast, FIG. 7 shows the male end portion 16 with a small space 74 in between its end 18 and the O-ring 36 which would occur when the handle 54 was in a second upward open position which would cause the bracket base 47 and the axles 32 to slide/move in slots 44 a sufficient distance toward the end 18 of female end portion 14 and male end portion 16 thereby allowing the release of pressure or a small amount of material as indicated by arrows 82 from the inside of the female portion 14 of the cam lock fitting 12. Arrows 82 illustrate material/fluid moving into space 74 and then out the fitting 12 by escaping between the male and female couplings 14, 16. Cam 24 remains disposed in groove 26 in both FIGS. 6 and 7 because lever 22 has not yet been raised. Previously disclosed elements may also be shown.

Turning to FIG. 8, therein is shown an enlarged view of portions of the present invention showing the hook-like finger 78 and protrusion 80 mounted on pivot pin 60 along with biasing means 84 in the form of spring having one end attached to a rear portion of finger 78 and an opposing end attached to an interior of its outer housing 86. Previously disclosed elements may also be shown.

Figure 9:
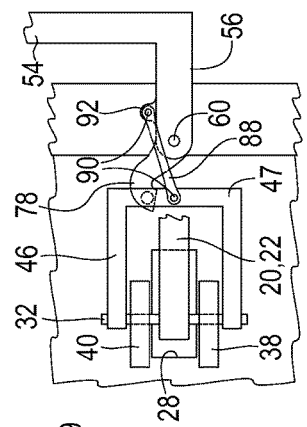
FIG. 9 is an enlarged view of an alternative embodiment of portions of the present invention.

Turning to FIG. 9, therein is shown an enlarged view similar to FIG. 3 of portions of the present invention showing an arm 88 having its ends pivotally connected at 90 by having one end connecting the base 47 of bracket 46 and an opposing end connected to lug 92 on arm portion 56 so as to provide an alternative embodiment for linking to and moving axles 32 with handle portion 54. Also note that bracket 46 is shortened. The present invention illustrated in FIG. 9 is the same in all other respects to that shown in FIG. 3. Previously disclosed elements may also be shown.

By way of additional general explanation, and by making reference to FIGS. 1-8, the present invention 10 discloses a safety lock mechanism generally indicated by number 52 mounted on an outside surface of female coupling 14 proximate the cam lever 20 wherein the safety lock mechanism has a handle 54 which moves a bracket 46 (or, alternatively, arm 88) connected to axles 32 so that when fluid in the cam lock fitting 12 is pressurized the handle remains in a first position 66 so as to seal and lock the cam lock fitting 12. In order to open the cam lock fitting 12, an operator must first move the handle 54 from the closed position 66 to open position 68 so as to allow the end 18 of male coupling 16 to initially move slightly away from the O-ring 36 of female coupling 14 thereby creating a small space 74 (see FIG. 7) to allow the operator to determine by visual observation whether the cam lock fitting is pressurized or unpressurized. If the cam lock fitting 12 remains pressurized, the operator can quickly and easily reclose the cam lock fitting 12 by reclosing the safety handle 54. If the cam lock fitting 12 is unpressurized, the operator can then proceed to open the cam lock fitting in the conventional manner. Also, latch 76 is provided to prevent lever 22 from being opened without first opening handle 54 and hook-like finger 78 is provided to prevent lever 22 from being closed without first closing handle 54. It should be clear that the present invention 10 teaches that additional steps are required to open or close a cam lock fitting constructed according to the teachings of the present invention 10, and, the additional steps involve opening or closing safety lock mechanism handle 54 as taught herein.

Direction arrows may be used in the drawings related to this specification to show direction of fluid flow, movement, or other activity/action described herein.

I claim:

1. An apparatus for a cam lock fitting safety lock, comprising:
   a) male and female conduits for being connected to each other, said male conduit having an end thereon and an external peripheral groove adjacent said end, said female conduit having an end thereon and an internal seal disposed therein adjacent said end, wherein said end of said male conduit contacts said seal of said female conduit when said male and female conduits are connected;
   b) first and second cam members being disposed on opposite sides of said female conduit, said cam members having a lever portion and a cam portion wherein each said cam portion is adapted to rotate through an opening in a wall of said female conduit and into said groove so as to removably join said male conduit to said female conduit, wherein each said cam member has a first closed position when said male and female conduits are connected and a second open position when said male and female conduits are disconnected from each other;
   c) wherein said end of said male conduit has a closed position when said end contacts said seal and a partially open position when said end is slightly separated from said seal by a space;
   d) a U-shaped handle, wherein said U-shaped handle fits partially around said female conduit, said U-shaped handle configured for movement between a first position and a second position;
   e) wherein said end of said male conduit is adapted to move between said closed position and said partially open position in response to movement of said U-shaped handle between said first and second positions; and,
   f) wherein when said U-shaped handle is in said first position said end of said male conduit is in said closed position in which said male and female conduits are connected thereby preventing leakage between said male and female conduits, wherein when said U-shaped handle is in said second position said end of said male conduit is in said partially open position thereby allowing leakage between said male and female conduits through said space, wherein if leakage is observed by an operator said U-shaped handle is moved back to said first position to permit the cam lock fitting to be reconnected.

2. The apparatus of claim 1, wherein said cam members are adapted to move in a line substantially parallel to a centerline of said female conduit between a rearward position and a forward position in response to movement of said U-shaped handle between said first and second positions, wherein when said cam members are in said rearward position said end of said male conduit is in said closed position and when said cam members are in said forward position said end of said male conduit is in said partially open position.

3. The apparatus of claim 2, further comprising first and second axles, wherein one said cam member is rotatably disposed on an axle, wherein said axles are adapted to move in a line substantially parallel to a centerline of said female conduit between a rearward position and a forward position in response to movement of said U-shaped handle between said first and second positions, wherein when said axles are in said rearward position said end of said male conduit is in said closed position and when said axles are in said forward position said end of said male conduit is in said partially open position.

4. The apparatus of claim 3, further comprising:
   a) a pair of first and second bosses, each said pair of bosses disposed on opposite sides of said outer surface of said female conduit, said first and second bosses are each disposed on opposite sides of and adjacent each said opening in said wall of said female conduit, an axle extending through each said pair of bosses so that said cam portion rotates through said opening in said wall of said female conduit;
   b) each said boss having an elongated slot therein wherein an end of each said axle is slidably disposed in each said slot; and,
   c) wherein said axles slide in said slots as said axles move between said rearward and forward positions.

5. The apparatus of claim 4, further comprising:
   a) a bracket corresponding to each said axle, each said bracket having a pair of distal end portions, each said distal end portion connected to a corresponding end of each said axle so as to cooperate with said axles as said axles move between said rearward and forward positions; and,
   b) each said bracket adapted to move between said rearward and forward positions in response to movement of said U-shaped handle between said first and second positions.

6. The apparatus of claim 5, further comprising each said bracket having a slot therein, each said slot for receiving a corresponding pin disposed on said U-shaped handle, wherein each said slot and said pin cooperate to move each said bracket between said rearward and forward positions in response to movement of said U-shaped handle between said first and second positions.

7. The apparatus of claim 5, further comprising an arm connecting each said bracket to said U-shaped handle so that each said bracket moves between said rearward and forward positions in response to movement of said U-shaped handle between said first and second positions.

8. The apparatus of claim 1, further comprising a latch which cooperates with said cam members to prevent said cam members from being moved from said first closed position to said second open position without first moving said U-shaped handle from said first position to said second position.

9. The apparatus of claim 1, further comprising an additional member which cooperates with said cam members to prevent said cam members from being moved from said second open position to said first closed position without first moving said U-shaped handle from said second position to said first position.

10. A method for a cam lock fitting safety lock, comprising the steps of:
a) providing male and female conduits for being connected to each other, the male conduit having an end thereon and an external peripheral groove adjacent the end, the female conduit having an end thereon and an internal seal disposed therein adjacent the end, wherein the end of the male conduit contacts the seal of the female conduit when the male and female conduits are connected;
b) providing first and second cam members on opposite sides of the female conduit, the cam members having a lever portion and a cam portion wherein each cam portion is adapted to rotate through an opening in a wall of the female conduit and into the groove so as to removably join the male conduit to the female conduit, wherein each cam member has a first closed position when the male and female conduits are connected and a second open position when the male and female conduits are disconnected from each other;
c) wherein the end of the male conduit has a closed position when the end contacts the seal and a partially open position when the end is slightly separated from the seal by a space;
d) providing a U-shaped handle, wherein the U-shaped handle fits partially around the female conduit, adapting the U-shaped handle for movement between a first position and a second position;
e) wherein the end of the male conduit is adapted to move between the closed position and the partially open position in response to movement of the U-shaped handle between the first and second positions; and,
f) wherein when the U-shaped handle is in the first position the end of the male conduit is in the closed position in which the male and female conduits are connected thereby preventing leakage between the male and female conduits, wherein when the U-shaped handle is in the second position the end of the male conduit is in the partially open position in which the male and female conduits are slightly separated thereby allowing leakage between the male and female conduits through the space, wherein if leakage is observed by an operator the U-shaped handle is moved back to the first position to permit the cam lock fitting to be reconnected.

11. The method of claim 10, wherein the cam members are adapted to move in a line substantially parallel to a centerline of the female conduit between a rearward position and a forward position in response to movement of the U-shaped handle between the first and second positions, wherein when the cam members are in the rearward position the end of the male conduit is in the closed position and when the cam members are in the forward position the end of the male conduit is in the partially open position.

12. The method of claim 11, further comprising the steps of providing first and second axles, wherein one cam member is rotatably disposed on an axle, wherein the axles are adapted to move in a line substantially parallel to a centerline of the female conduit between a rearward position and a forward position in response to movement of the U-shaped handle between the first and second positions, wherein when the axles are in the rearward position the end of the male conduit is in the closed position and when the axles are in the forward position the end of the male conduit is in the partially open position.

13. The method of claim 12, further comprising the steps of:
a) providing a pair of first and second bosses, each pair of bosses disposed on opposite sides of the outer surface of the female conduit, wherein the first and second bosses are each disposed on opposite sides of and adjacent each opening in the wall of the female conduit, extending an axle through each pair of bosses so that the cam portion rotates through the opening in the wall of the female conduit;
b) providing an elongated slot each boss wherein an end of each axle is slidably disposed in each slot; and,
c) wherein the axles slide in the slots as the axles move between the rearward and forward positions.

14. The method of claim 13, further comprising the steps of:
a) providing a bracket corresponding to each axle, each bracket having a pair of distal end portions, each distal end portion connected to a corresponding end of each axle so as to cooperate with the axles as the axles move between the rearward and forward positions; and,
b) wherein each bracket is adapted to move between the rearward and forward positions in response to movement of the U-shaped handle between the first and second positions.

15. The method of claim 14, further comprising the step of providing a slot in each bracket, wherein each slot receives a corresponding pin disposed on the U-shaped handle, wherein each slot and pin cooperate to move each bracket between the rearward and forward positions in response to movement of the U-shaped handle between the first and second positions.

16. The method of claim 14, further comprising the step of providing an arm connecting each bracket to the U-shaped handle so that each bracket moves between the rearward and forward positions in response to movement of the U-shaped handle between the first and second positions.

17. The method of claim 10, further comprising the step of providing a latch which cooperates with the cam members to prevent the cam members from being moved from the first closed position to the second open position without first moving the U-shaped handle from the first position to the second position.

18. The method of claim 10, further comprising the step of providing an additional member which cooperates with the cam members to prevent the cam members from being moved from the second open position to the first closed position without first moving the U-shaped handle from the second position to the first position.

* * * * *